US011295367B2

(12) United States Patent
Avlani et al.

(10) Patent No.: US 11,295,367 B2
(45) Date of Patent: Apr. 5, 2022

(54) SYSTEM FOR IN-STORE CONSUMER BEHAVIOUR EVENT METADATA AGGREGATION, DATA VERIFICATION AND THE ARTIFICIAL INTELLIGENCE ANALYSIS THEREOF FOR DATA INTERPRETATION AND ASSOCIATED ACTION TRIGGERING

(71) Applicants: Dipesh Avlani, Rouse Hill (AU); Sean Taheny, Croydon (AU); Karl Guiney, Lilyfield (AU)

(72) Inventors: Dipesh Avlani, Rouse Hill (AU); Sean Taheny, Croydon (AU); Karl Guiney, Lilyfield (AU)

( * ) Notice: Subject to any disclaimer, the term of this patent is extended or adjusted under 35 U.S.C. 154(b) by 188 days.

(21) Appl. No.: 16/624,120

(22) PCT Filed: Jun. 22, 2018

(86) PCT No.: PCT/AU2018/050622
§ 371 (c)(1),
(2) Date: Dec. 18, 2019

(87) PCT Pub. No.: WO2018/232463
PCT Pub. Date: Dec. 27, 2018

(65) Prior Publication Data
US 2020/0134695 A1 Apr. 30, 2020

(30) Foreign Application Priority Data

Jun. 22, 2017 (AU) .................. 2017902404

(51) Int. Cl.
*G06Q 10/06* (2012.01)
*G06Q 30/06* (2012.01)
*G06N 20/00* (2019.01)
*G06N 5/04* (2006.01)
*G06Q 30/02* (2012.01)

(52) U.S. Cl.
CPC .......... *G06Q 30/0631* (2013.01); *G06N 5/04* (2013.01); *G06N 20/00* (2019.01); *G06Q 30/0201* (2013.01)

(58) Field of Classification Search
CPC .......... G06Q 30/0631; G06Q 30/0201; G06N 20/00; G06N 5/04
(Continued)

(56) References Cited

U.S. PATENT DOCUMENTS

2012/0278205 A1   11/2012  Chin
2014/0089079 A1*  3/2014  Dedeoglu .......... G06Q 30/0242
                                                   705/14.41
(Continued)

FOREIGN PATENT DOCUMENTS

WO   2016210354 A1   12/2016

OTHER PUBLICATIONS

Microsoft Builds Fridge That Creates a Shopping List and Sends it to Your Phone. ICT Monitor Worldwide [Amman] Sep. 5, 2016.*
(Continued)

*Primary Examiner* — Timothy Padot
(74) *Attorney, Agent, or Firm* — Innovation Capital Law Group, LLP; Vic Lin

(57) ABSTRACT

There is provided a system for in-store consumer behaviour event metadata aggregation, data verification and the artificial intelligence analysis thereof for data interpretation and associated action triggering. The system may collect in-store consumer behaviour event metadata from a plurality of consumer electronic devices and then uses a trained artificial intelligence analytics engine to provide various artificial intelligence insights useful to such consumers which may further modify consumer behaviour. The trained artificial intelligence analytics engine may have a data interpretation controller configured for intelligently interpreting such (Continued)

aggregated in-store consumer behaviour event metadata and triggering actions accordingly which are then sent electronically to the consumer electronic devices. The data interpretation controller may have a data verification controller configured to optimise the data integrity of a consumer product metadata database representing a plurality of consumer products according to availability and other metadata.

18 Claims, 7 Drawing Sheets

(58) Field of Classification Search
USPC .......................................................... 705/7.29
See application file for complete search history.

(56) References Cited

U.S. PATENT DOCUMENTS

| | | | |
|---|---|---|---|
| 2014/0095285 A1* | 4/2014 | Wadell | G06Q 30/00 |
| | | | 705/14.25 |
| 2014/0180826 A1* | 6/2014 | Boal | G06Q 20/209 |
| | | | 705/14.66 |
| 2015/0112826 A1* | 4/2015 | Crutchfield, Jr. | G06Q 30/0601 |
| | | | 705/26.1 |
| 2016/0212266 A1 | 7/2016 | Soundar | |
| 2017/0116620 A1 | 4/2017 | Unser et al. | |
| 2017/0236131 A1* | 8/2017 | Nathenson | G06Q 30/0631 |
| | | | 705/26.7 |
| 2018/0285893 A1* | 10/2018 | Deluca | G06Q 30/0201 |

OTHER PUBLICATIONS

Are robots the future of retailing? Consumers are gravitating toward artificial intelligence tools, which could enhance the customer experience. Zisko, Allison. HFN Home Furnishings News 91.6: 18(2). MacFadden Communications Group. LLC. (Jun. 2017).*
International Search Report dated Sep. 28, 2018 from corresponding PCT Application No. PCT/AU2018/050622.

* cited by examiner

SYSTEM FOR IN-STORE CONSUMER BEHAVIOUR EVENT METADATA AGGREGATION, DATA VERIFICATION AND THE ARTIFICIAL INTELLIGENCE ANALYSIS THEREOF FOR DATA INTERPRETATION AND ASSOCIATED ACTION TRIGGERING

A system for in-store consumer behaviour event metadata aggregation, data verification and the artificial intelligence analysis thereof for data interpretation and associated action triggering

FIELD OF THE INVENTION

This invention relates generally to intelligence analytics engines and more particularly, this invention relates to a system for in-store consumer behaviour event metadata aggregation, data verification and the artificial intelligence analysis thereof for data interpretation and associated action triggering suited for in-store application within the real world.

BACKGROUND OF THE INVENTION

Consumer behaviour data aggregation analysis and event triggering is commonplace online. For example, various providers track consumer behaviour including consumer interest across a plurality of websites utilising tracking techniques including utilisation of cookies whereafter, once consumer interest is identified, targeted advertising is then provided to consumers accordingly.

However, such systems are not readily applicable to real-world application such as for utilisation for in-store consumer behaviour analysis and consumer behaviour modification.

Problems involved in seeking to deploy such analytical engines in the real world include problems of consumer product metadata integrity in that products vary greatly in both availability and pricing across different stores.

Furthermore, difficulties exist in obtaining consumer behaviour metadata from the real world.

Further, prior art online targeted advertising analytical engines generally only go so far as providing targeted advertising selected from an ad database in accordance with an ascertained user interest. However, it would be ideal for a system that is able to do much more than this including in generating further artificial intelligence insights useful to the consumer in the real world.

The present invention seeks to provide a system and associated methodology, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

In the embodiments that follow, there is provided a system for in-store consumer behaviour event metadata aggregation, data verification and the artificial intelligence analysis thereof for data interpretation and associated action triggering which overcomes, or at least ameliorates problems of prior art systems, or at least provides an alternative.

As will be described in further detail below, the system collects in-store consumer behaviour event metadata from a plurality of consumer electronic devices and then utilises a trained artificial intelligence analytics engine to provide various artificial intelligence insights useful to such consumers which may further modify consumer behaviour.

As will be described in further detail below, the trained artificial intelligence analytics engine has a data interpretation controller configured for intelligently interpreting such aggregated in-store consumer behaviour event metadata and triggering actions accordingly which are then sent electronically to the consumer electronic devices.

In embodiments, the data interpretation controller comprises a data verification controller configured to optimise the data integrity of a consumer product metadata database representing a plurality of consumer products according to availability and other metadata (such as store locations, pricing and the like). As such, the data verification controller is configured for firstly building a relatively accurate consumer product metadata model in a manner that addresses the challenges of such data aggregation in the real world where after, once having built such a relatively accurate data model, further artificial intelligence insights may be performed by the system.

In this regard, the system may further comprise intelligent product suggestion capabilities wherein the data interpretation controller comprises a product suggestion controller.

The present system utilises a shopping list graphical user interface (GUI) displayed via display device of the plurality of consumer electronic devices, the shopping list GUI configured for displaying a plurality of consumer specific consumer products and a list format and wherein each consumer product displayed comprises an associated purchase confirmation input (a checkbox or the like) indicative of the purchase thereof.

As such, by utilising such consumer specific shopping lists and particularly the consumer products listed thereon, the product suggestion controller is able to intelligently suggest products for consideration by the consumer.

The product suggestion controller is able to, in embodiments, suggest particular products within product categories in an intelligent manner such as which may be ascertained from consumer specific parameters or derived from machine learning of in-store consumer behaviour event metadata derived from other consumers.

Also, the product suggestion controller is able to, in embodiments, suggest seemingly unrelated products but which may be relevant to the user as having been identified by analysis performed by the machine learning algorithm.

Furthermore, the trained artificial intelligence analytics engine is able to, in embodiments, generate intelligent consumer product informational notifications which may be helpful for consumers. Such consumer product informational notifications may be further derived from the machine learning algorithm.

According to one aspect, there is provided a system for in-store consumer behaviour event metadata aggregation, data verification and the artificial intelligence analysis thereof for data interpretation and associated action triggering, the system comprising: a data model having: consumer product metadata comprising at least: consumer product ID metadata; and consumer product location metadata the system configured for: receiving in-store consumer behaviour event metadata from a plurality of consumer electronic devices, the in-store consumer behaviour event metadata at least partially derived from a shopping list GUI displayed by a display device of each of the consumer electronic devices, the shopping list GUI comprising a listing of consumer-specific consumer products and associated purchase confirmation inputs indicative of the purchase thereof, inputting the in-store consumer behaviour event metadata into a trained artificial intelligence analytics engine, the artificial intelligence analytics engine having been trained using a machine learning algorithm having as input in-store consumer behaviour event metadata training data and wherein the machine learning algorithm is at least trained in accordance with purchase confirmation data derived from the purchase confirmation inputs, the analytics engine comprising: a data interpretation controller comprising: a data verification data interpretation controller, and an action triggering controller comprising: a data verification action controller wherein, the data verification data interpretation controller is configured for identifying a data verification opportunity match in accordance with the in-store consumer behaviour event metadata; and generating a data verification action using the data verification action controller, the data verification action configured according to the in-store consumer behaviour event metadata; sending a data verification action electronic communication to at least one of the plurality of consumer electronic devices; receiving product data metadata response data responsive to the data verification action electronic communication from the at least one shopper electronic device; and updating the consumer product data using the product data metadata response data.

The data interpretation controller may further comprise: a product suggestion data interpretation controller and wherein the action triggering controller may further comprise: a product suggestion action controller and wherein, in use: the product suggestion data interpretation controller may be configured for identifying a product suggestion opportunity match in accordance with the in-store consumer behaviour event metadata; and the product suggestion action controller may be configured for generating and sending a product suggestion action for display by the shopping list GUI.

The product suggestion action may comprise in-store location data of the product suggestion.

The in-store location data may be indicative of at least one of an aisle number and shelf.

The electronic device may further comprise a sensor for sensing in-store location data and wherein the in-store consumer behaviour event metadata may further comprise the in-store location data.

The sensor may comprise at least one of a near field communication sensor and Bluetooth beacon (BLE) sensor.

The electronic device may further comprise an image sensor for capturing an image of a product and wherein product data may be derived from the image.

The product data may comprise at least one of product ID and product pricing data.

The data interpretation controller may further comprise: an informational notification data interpretation controller; and wherein the action triggering controller may further comprise: an informational notification action controller and wherein, in use: the informational notification data interpretation controller may be configured for identifying and informational notification opportunity match in accordance with the in-store consumer behaviour event metadata, and the informational notification action controller may be configured for sending a notification to the at least one electronic device.

The data interpretation controller may be optimised using the machine learning algorithm.

The action triggering controller may be optimised using the machine learning algorithm.

The machine learning algorithm may be configured for optimising the product suggestion controller according to purchase confirmation input data derived from the shopping list GUI.

The machine learning algorithm may be configured for optimising the data verification data interpretation controller according to the probability of receipt of the product data metadata response data.

The machine learning algorithm may be configured for optimising the data verification data interpretation controller according data integrity of the product data metadata response data.

The machine learning algorithm may be configured for optimising the informational controller according to consumer interactions with informational notification prompts.

The consumer product metadata may comprise at least one product category.

The product data metadata response data may comprise product price metadata.

The in-store consumer behaviour event metadata may comprise image data and wherein the machine learning algorithm may be configured for optimising the product suggestion action controller using to object recognition of the image data.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
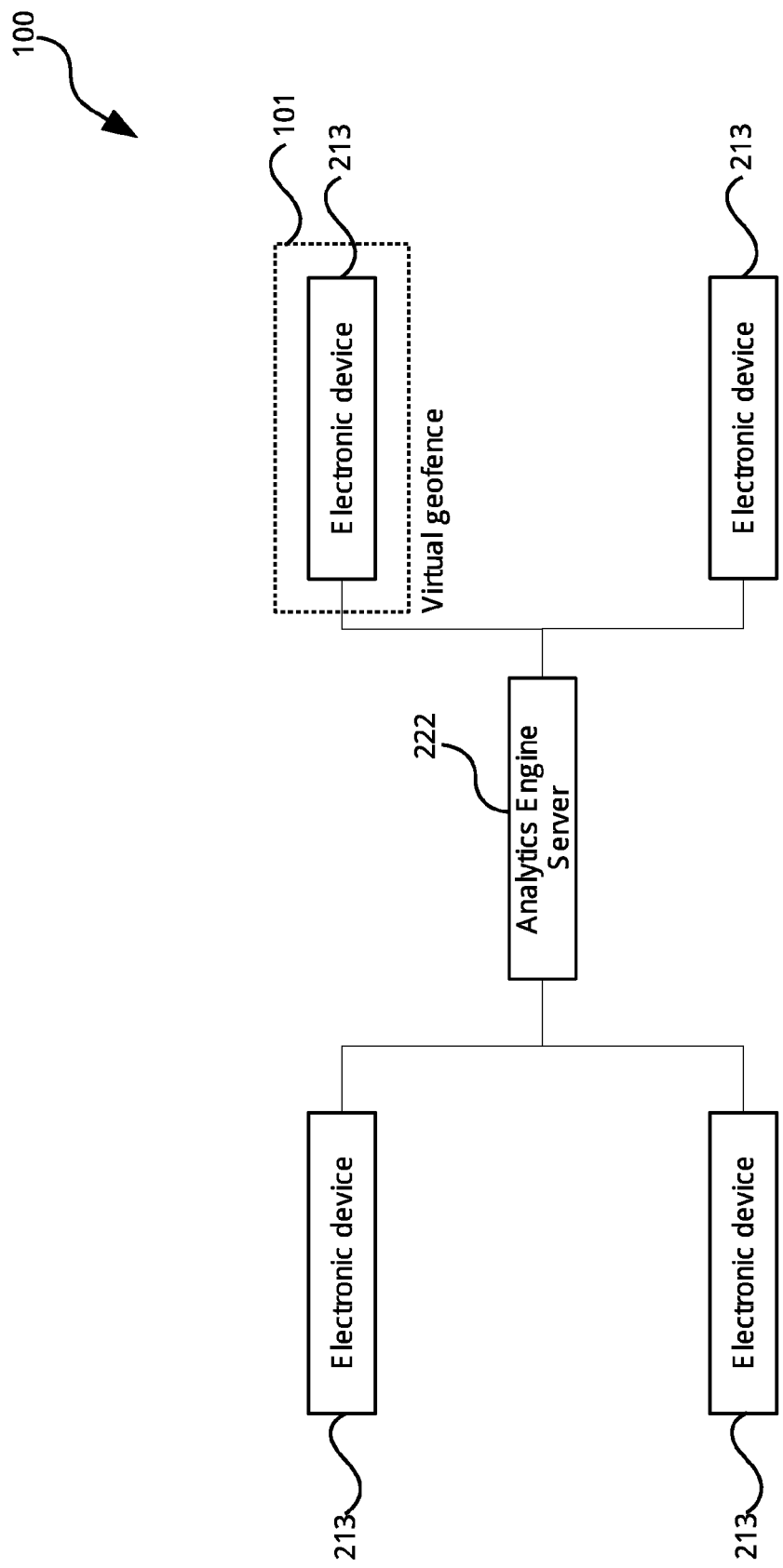
FIG. 1 shows a computer network for in-store consumer behaviour event metadata aggregation, data verification and the artificial intelligence analysis thereof for data interpretation and associated action triggering in accordance with an embodiment.

Turning now to FIG. 1, there is shown an exemplary network 100 of consumer electronic devices 213. As can be seen, the network 100 comprises a plurality of consumer electronic devices 213 each in operable communication with an analytics engine server 222 across a data network.

The consumer electronic devices 213 belong to differing consumers and may be within differing locations including those which may be classified in accordance with virtual geo-fences 101 by the network 100, which, in embodiment, may represent various stores.

As will be described in further detail below, consumers utilise such consumer electronic devices 213 in-store such that the network 100 is able to receive in-store consumer behaviour event metadata from such consumer electronic devices 213 so as to be able to perform the machine learning and artificial intelligence analytics described herein accordingly.

Figure 2:
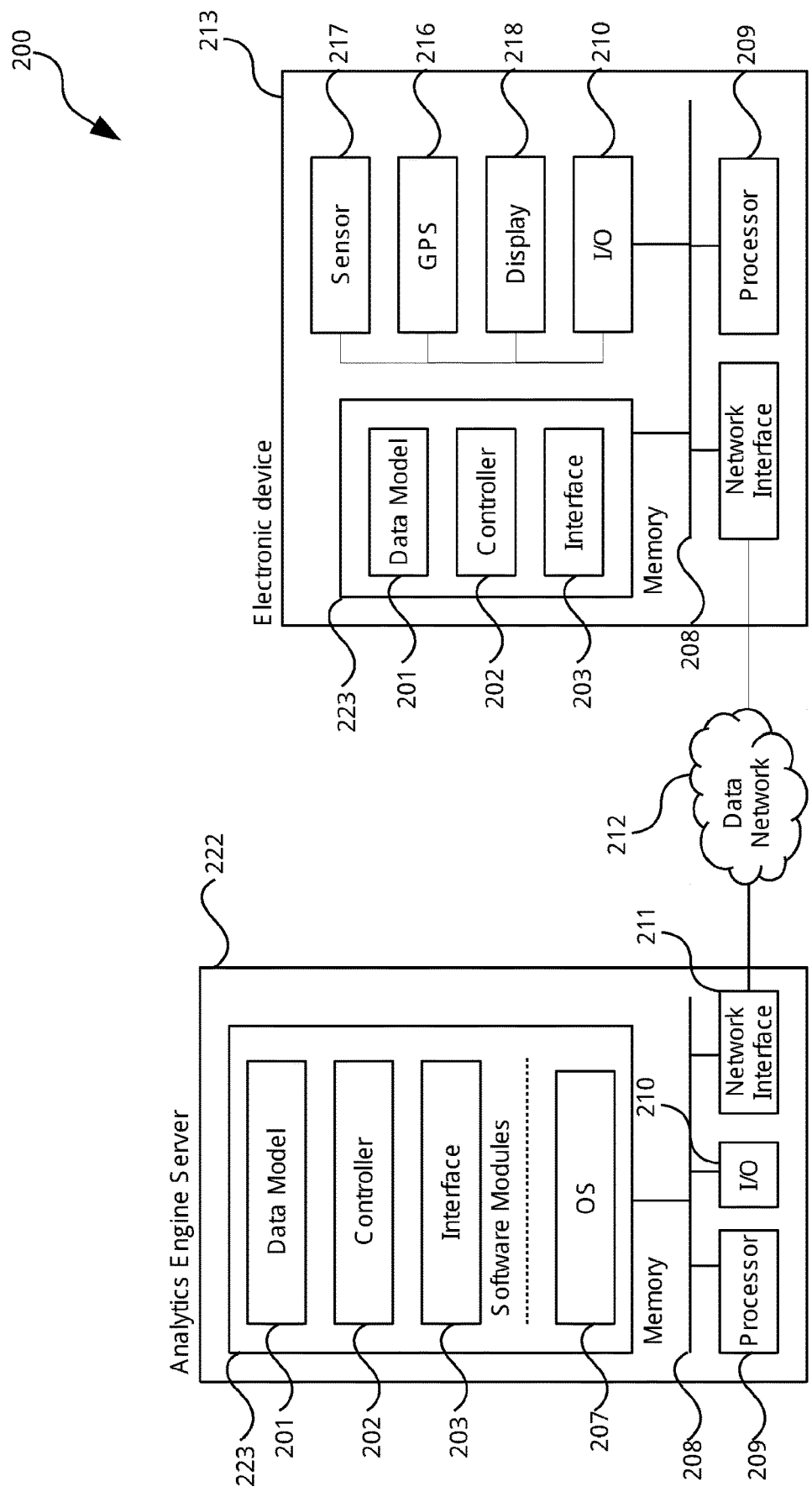
FIG. 2 shows a computational architecture illustrating the server and electronic device of the network of FIG. 1 in further detail in accordance with an embodiment.

Turning now to FIG. 2, there is shown a computer system 200 showing the analytics engine server 222 and the consumer electronic devices 213 of the network 100 in further detail in accordance with an embodiment.

As can be seen, each of the analytics engine server 222 and consumer electronic devices 213 may take the form of a computational device having a processor 209 for processing digital data.

In embodiments, as opposed to having an analytics engine server 222, the system 200 may utilise distributed processing of a decentralised smart contract blockchain platform, such as the Ethereum™ blockchain platform.

The processor 209 may be in operable communication with a memory device 223 across a system bus 208. The memory device 223 is configured for storing digital data including computer program code instructions. As such, in use, the processor 209 fetches these computer code instructions from a memory device 223 for execution and wherein data results may be stored again within the memory device 223.

For illustrative convenience, these computer code instructions have been divided into data model 201, controller 202 and interface 203 modules.

In general terms, the data model 201 comprises the applicable data storage structure (such as the tables of a relational database) and the data stored therein.

Furthermore, the interface module 203 control various aspects of the various user interface GUIs.

Furthermore, the controller 202 performs various computing tasks and including in interfacing the interface 203 and a data model 201 modules.

The memory device 223 may further comprise an operating system 207, such as the Linux kernel, or mobile operating system which is retrieved by the processor 209 during the bootstrap phase. In the embodiment wherein a decentralised smart contract blockchain platform is used the memory device 223 may store all or a part of the relevant blockchain ledger including data from the various transactions described herein.

Each computer device may further comprise an I/O interface 210 for interfacing with various computer peripherals including data storage, sensor and user interface peripherals.

As is shown with respect to the consumer electronic devices 213, the I/O interface 210 may interface with a digital display 218 for the display of digital data. The digital display 218 may be overlaid with a haptic sensor so as to be able to ascertain user interface gestures.

The I/O interface 210 may further interface with a GPS sensor 216 so as to be able to ascertain the location of the consumer electronic device 213 including for the purposes of detecting breaching of the aforedescribed virtual geo-fence 101.

In a further embodiment, the consumer electronic devices 213 may comprise other sensors 217 which sensors may include sensors for reading product data from consumer products (nutritional information and product appearance for example), aisle labels (product location and aisle grouping of product categories within an aisle for example), shelf labels (in-store retailer specific product code/barcode, product name, shelf price, price special status, product range groupings for example), ascertaining in-store location, such as utilising aisle specific near field location determination technologies (such as near field communication (NFC) systems) and the like.

Each computer device may further comprise a network interface 211 for sending and receiving data across a data network 212.

In embodiments, the analytics engine server 222 is "in the cloud" and may take the form of a physical rack mounted server or alternatively a virtualised server instance such as which may be implemented by Amazon Web Services™ (AWS) for example. Alternatively, as alluded to above, the analytics engine server 222 may take the form of smart contract blockchain platform wherein smart contracts are used to describe the terms of peer-to-peer transactions between users of the blockchain without the need for a centralised server.

Furthermore, the consumer electronic devices 213 may take the form of a small form factor electronic device comprising appropriate electronic circuitry for the purposes of gathering the data described herein and sending such to the analytics engine server 222 across a data network 212.

In embodiment, the consumer electronic device 213 may take the form of a mobile communication device, such as a smartphone device, such as an Apple iPhone and/or Google android device or the like. In this embodiment, so as to configure the mobile communication device for the particular computational processes described herein, the user may download the modules 201, 202 and 203 to the memory device 223 by way of a downloadable software application "app" which may be, for example, downloaded for installation and execution by the consumer electronic device 213 from a software application store, such as the Apple App Store™, Google Chrome App Store™, or Firefox App Store™, or the like.

Figure 3:
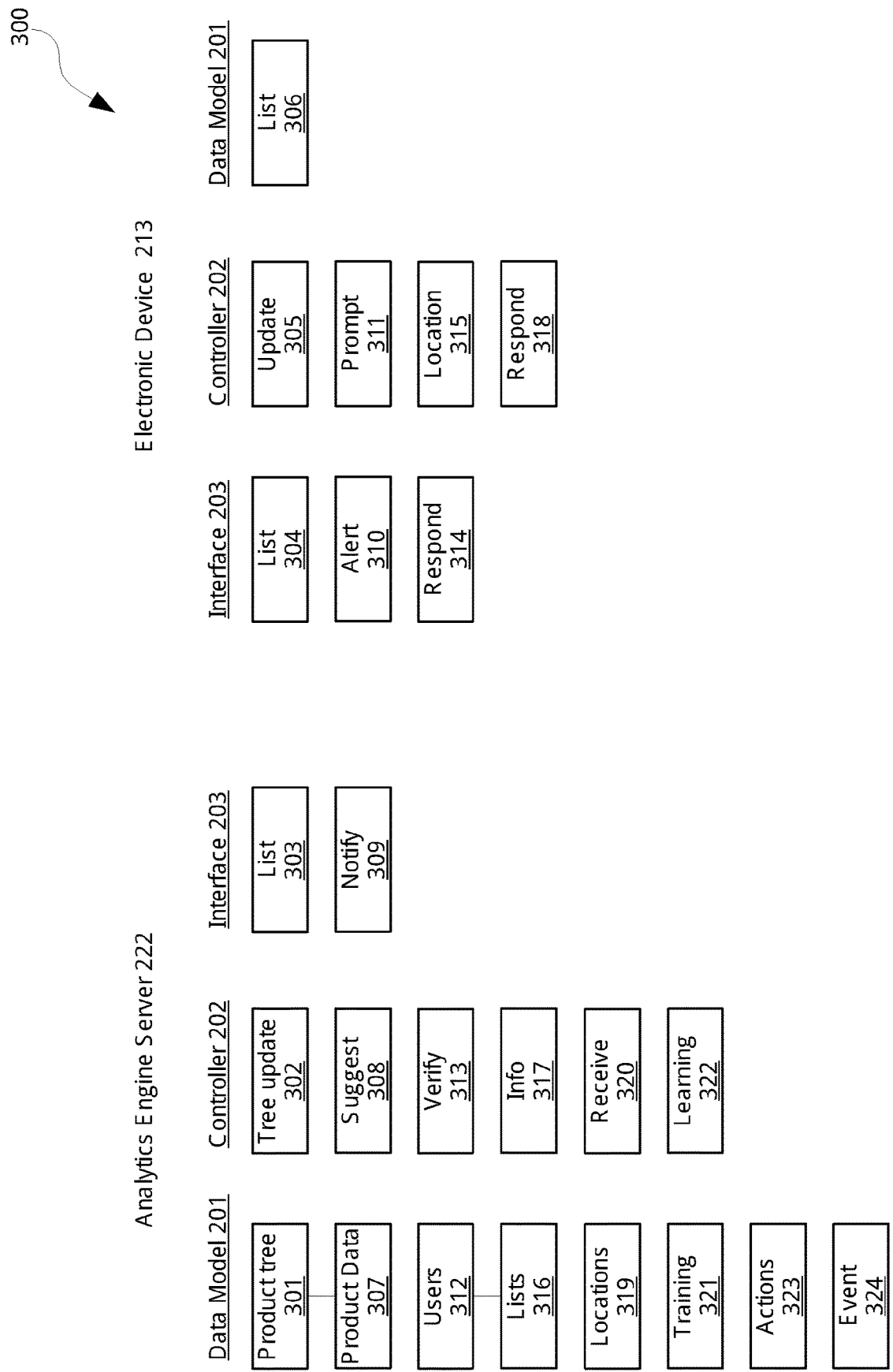
FIG. 3 shows an exemplary data model, controller and interface module representation for each of the server and electronic device in accordance with an embodiment.

Turning now to FIG. 3, there is shown exemplary data model 201, controller 202 and interface 203 representations for each of the analytics engine server 222 and the consumer electronic device 213.

As is shown, the analytics engine server 222 controller 202 trained artificial intelligence analytics engine may comprise a data interpretation controller comprising the consumer product suggestion controller 308, data verification controller 313 and informational controller 317.

The data interpretation controller modules may identify various matching actions 323 from the data model 201 in accordance with the received in-store consumer behaviour event meta data 324 received from the plurality of consumer electronic devices 213.

These actions 323 may then be conveyed to the consumers by way of the interface module 203 of the analytics engine server 222 and associated consumer electronic devices 213.

Figure 5:
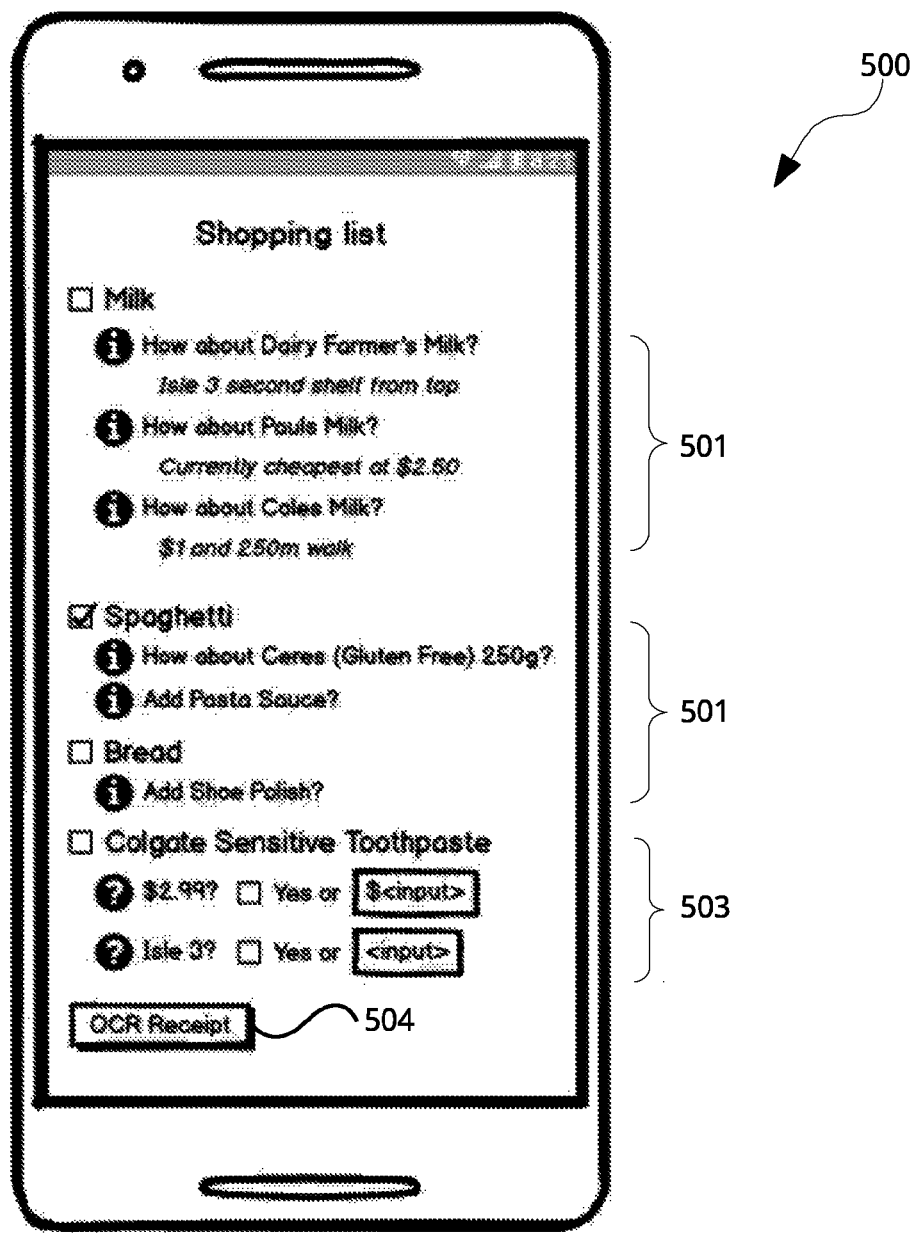
FIG. 5 shows an exemplary shopping list graphical user interface displayed by the electronic device of the system of FIG. 2 in accordance with an embodiment.

Specifically, the interface module 203 of the consumer electronic device 213 may display a shopping list graphical user interface 304 (as is substantially shown in FIG. 5).

However, information may be displayed on the consumer electronic devices 213 in other manners, such as by way of an alert interface 310.

The data model 201 of the analytics engine server 222 may comprise consumer product and shopping metadata 301. In embodiment, the consumer product and shopping metadata 301 takes the form of a product tree which, as is described in further detail below, is continuously updated so as to take into account changes and product information availability and the like across differing stores.

In embodiments, the product tree may be arranged in a hierarchy of product categories (such as "quick products", services, such as milk, bread, sugar, hair cut, phone screen repair, car tune up and the like) and within these consumer product & service categories, specific consumer products, such as Dairy Farmers milk, Coles milk, Devondale The Creamy One Full Cream Milk 1 Ltr, Lube Mobile 50000 km Service 2013 RENAULT KOLEOS 2.5 L 4CYL FWD PETROL MPFI 2TRA DOHC 16V (08-16) and the like.

Associated with the products within the product tree 301 may be product data 307 representing various metadata, such as product pricing, Product Popularity, Product Group metadata (such as Product Multi-Pack Number, Product Multi-Buy Partner Products, Product Multi-Buy Price, Product Price Change Partner Products, Nutritional Information, Recipes and the like), Product Purchase Incentives, Product Metadata Accuracy, Product Metadata Update Incentives, product location, including store location and in-store location data (such as aisle number, shelf number and the like) and other applicable product metadata.

Furthermore, the data model 201 may comprise user's data 312 representing the various consumers using the system 200 (for example demographic data, personal information, personal preferences, relationships with friends, family, metadata submitted by users and the like).

Stored in relation to the users may be shopping lists 316 the aforementioned consumer specific shopping lists 316, events 324, actions 323, product data 307, product tree items 301, locations 319, and user's data 312.

The shopping list data 316 may represent the various consumer products within each consumer's shopping list (including recipe ingredient lists, Product Metadata Update Incentives Lists (such as Price Confirmations required, Barcodes Required), list of informational updates (such as with information like ratings which may incentivise to swap for other products)), and also other data, such as an indication as to whether the consumer has or has not purchased such an item, the confirmation status by other consumers for a product price submission from a local store, valuable insights (including price savings for the consumer swapping list items to another product or store, forgotten and likely needed items that are not on the shopping list, location of the items within the consumers selected store, items likely to better meet the needs of the consumer than items already on the shopping list and the like), incentives awarded for the consumer actioning metadata update events and the like.

As can be seen, the data model 201 of the consumer electronic device 213 may further comprise corresponding list data 306 within the data model 201.

As such, utilising the shopping list graphical user interface 304, the consumer electronic device 213 is able to update the list 306 utilising an update controller 305.

The data model 201 of the analytics engine server 222 may further comprise training data 321 utilised for training the machine learning algorithm 322. In embodiments, the training data 321 may utilise in-store consumer behaviour training data derived from a plurality of consumer electronic devices 213, and may use data from third party sources including from social networks, such as a Facebook, statistical data services, such as Australian Bureau of Statistics, and the like.

As is shown, each of the product suggestion, data verification and informational notification controllers of the data interpretation controller may update the list interface 303 or alternatively generate a notification 309 displayed by way of an alert which is displayed either on the shopping list graphical user interface 304 or alert interface 310 of the plurality of consumer electronic devices 213.

The consumer electronic device 213 may comprise a prompt controller 311 configured for generating an electronic prompt according with the relevant action and wherein, in embodiments, especially for the data verification actions, informational notification actions, and product suggestion actions, the user may respond via a respond interface 314 controlled by respond controller 318 with product data metadata response data which is then received by a receiver controller 320 of the analytics engine server 222 for the purposes of updating the product tree 301 utilising a product tree update controller 302. Furthermore, in embodiments, there may be also be update controllers configured for updating other shopping information, such as user data 312, list data 316, store data and the like.

Figure 4:
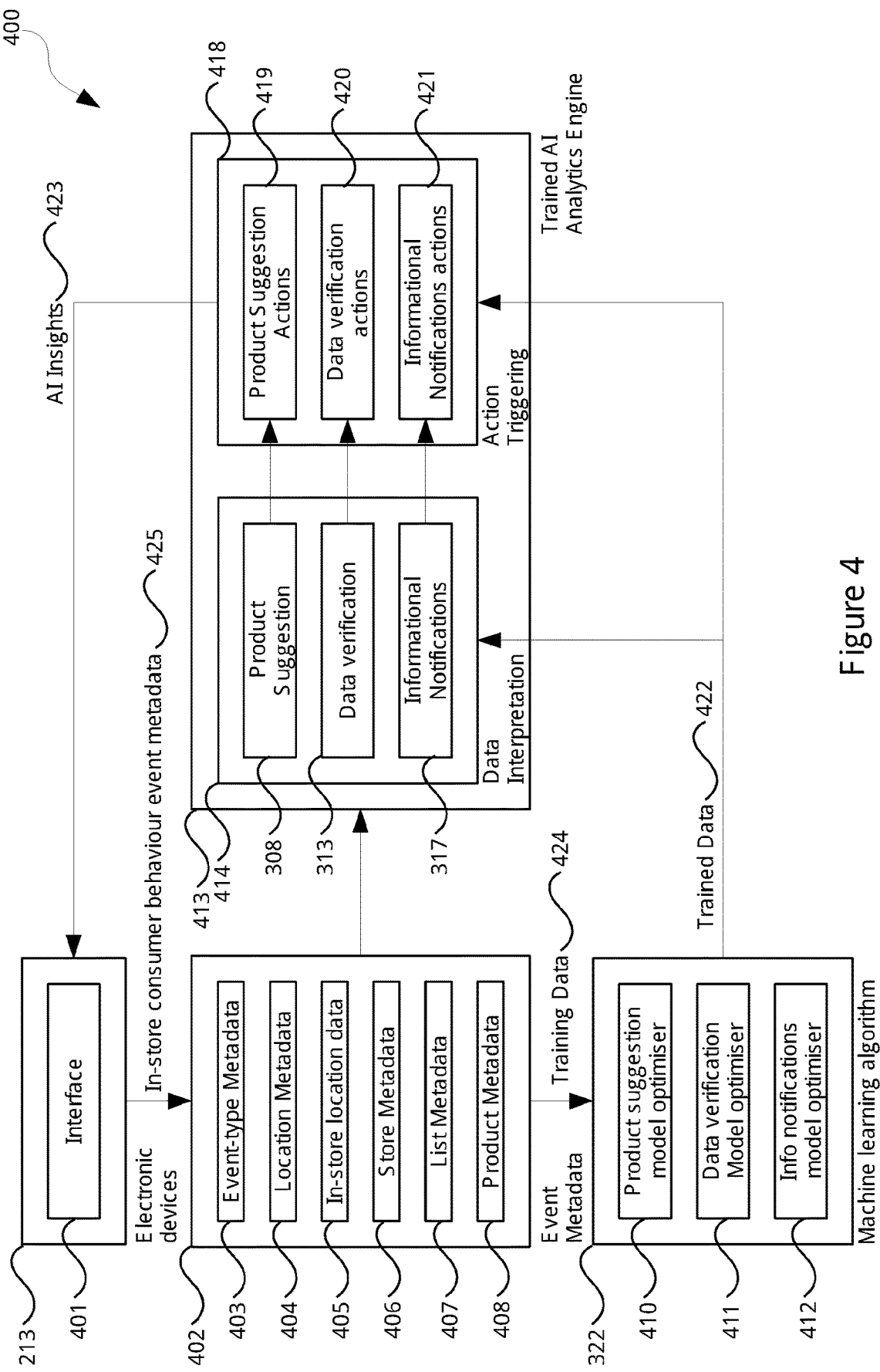
FIG. 4 shows an exam pre-dataflow for in-store consumer behaviour event metadata aggregation, data verification and the artificial intelligence analysis thereof for data interpretation and associated action triggering in accordance with an embodiment.

Turning onto FIG. 4, there is shown an exemplary data flow 400 of the system 200.

As is shown, in-store consumer behaviour event metadata 425 is received from the plurality of consumer electronic devices 213.

As alluded to above, the in-store consumer behaviour event metadata 425 may be at least partially derived from a shopping list graphical user interface 304 (as is substantially shown in FIG. 5) displayed by the display device of each of the consumer electronic devices 213, which may further comprise purchase confirmation data indicative of the purchase by the consumer of each of the displayed consumer products.

As will be described in further detail below, the shopping list graphical user interface 304 further comprises a listing of consumer specific consumer products and associated purchase confirmation input (checkbox or other type of input) indicative of the purchase thereof. As such, utilising such a GUI, the system is able to identify the relevant consumer products for each consumer and furthermore ascertain whether or not each listed item has been purchased by the consumer or not, metadata related to the relevant products (including the availability, likely current price, quick products and the like) within the consumers selected store, user metadata (including consumer segmentation, and incentivisation threshold for metadata collection actions in relation to events based on relevant products and temporality of shopping events), store metadata (including likely effort to complete shopping and the like), and events with associated metadata (including Metadata Update Incentives for Products, Stores, Lists, Users, reviews, prices, availability and the like).

Additional information may be received also from each electronic device such as location data received via the GPS sensor 216.

Furthermore, other information may be received from each consumer electronic device 213 utilising other types of sensors 217.

For example, the consumer electronic device 213 may comprise an image sensor allowing, for example, the consumer to capture image data of a product, so as to allow the system 200 to recognise a product, such as in accordance with various visual features of the product, including reading the barcode provided thereon (including reading product image into a trained AI object recognition engine).

Alternatively, as opposed to capturing image data of the product, pricing data may be captured, such as by capturing an image of a price tag displayed adjacent products utilising the sensor 217.

Alternatively, as opposed to capturing image data of the product, level of activity, aesthetic appeal, amenity and the like may be captured, such as by capturing an image of the front of stores, nearby stores, or car park utilising the sensor 217.

Alternatively, as opposed to capturing image data of the product, proof of purchase, in-store attendance and the like may be captured, such as by capturing an image of the a QR code utilising the sensor 217.

Alternatively, as opposed to capturing image data of the product, pricing information (price, unit price, special price, discount rate, product, proof of purchase), list information (including products purchased, store metadata, total purchase price, purchase method, register number, register attendant details, store manager details, volume purchased, quantity purchased, product receipt alias name, taxation status and the like) may be captured, such as by capturing an image of the purchase receipt utilising the sensor 217.

In further embodiments, the sensor 217 is configured for determining the location of the in-store consumer specifically down to aisle resolution (including aisle number, aisle grouping and nearby products and the like) and, in further embodiments, shelf resolution.

For example, in-store, a plurality of near field communication tags may be provided in various aisles or shelves which may then be scanned by the sensor 217 to ascertain the location of the consumer electronic device 213 in-store.

Alternatively, Bluetooth beacon technology may be utilised wherein the sensor 217 utilises received signal strength measurements to ascertain the location of the consumer electronic device 213 with reference to one or more Bluetooth beacons in-store.

In embodiments, and as is also alluded to in FIG. 5, such in-store location data may be derived from user input, including for consumer electronic devices 213 not having such sensors 217.

As is shown, event metadata 402 is derived from the in-store consumer behaviour event metadata 425.

Such event metadata 402 may represent various consumer events, such as the purchase of a product, the entering of a store (determined by the inward breaching of a virtual geo-fence 101), the returning of the consumer home (determined by the outward breaching of a virtual geo-fence 101), Quick Product selection, Product Optimization, Arriving home (inward breach of assumed 'Home' location geo-fence), Accepting Incentives (like Metadata Update, Informational Incentives etc.), Redeeming Incentives and other consumer events.

As is shown, the event metadata 402 may comprise event type metadata 403 indicative of the type of consumer behaviour event and location metadata 404 indicative of the location of the event.

The consumer behaviour event and location metadata 404 may be derived from the GPS sensor 216 and may, in embodiments, be utilised by the system 200 for determining in which store the consumer is currently in and also important locations for events outside of the store (including Home, Work, Commute Start and End and the like). Important event locations can be determined by AI models trained to recognise the most optimal locations (to notify, suggest, incentivise etc.). The models take into consideration not only the current users locations but could also consider the other locations and attributes of other users in the network at the time.

The event metadata 402 may further comprise higher resolution in-store location data 405 representing the location of the user within the store, such as a particular aisle, shelf or the like.

The event metadata 402 may further comprise list metadata 407 which may include the consumer specific shopping list including associated metadata including metadata indicative of the consumer's purchase thereof.

Furthermore, the event metadata 402 may further comprise product metadata 408 being metadata applicable to various consumer products. Such product metadata 408 may represent product price, product location, product availability or other applicable product metadata.

As is shown, the event metadata 402 is fed into a trained artificial intelligence analytics engine 413.

Having as input such data, the trained artificial intelligence analytics engine 413 is configured to generate intelligent artificial intelligence insights 423 which may then be conveyed back to relevant electronic devices of the network 213. Such insights are any intelligent data and/or notifications which may be useful to the network of consumers during the shopping process.

Specifically, the trained artificial intelligence analytics engine 413 may comprise a data interpretation controller 414. The data interpretation controller 414 interprets the event metadata 402 so as to be able to match various opportunities for the generation of associated actions.

Specifically, as is shown, the trained artificial intelligence analytics engine 413 may comprise an action triggering controller 418.

As such, for any potential match opportunities identified by the data interpretation controller 414 utilising the aggregated event metadata 402, the trained artificial intelligence analytics engine 413 is able to trigger an associated and applicable action utilising the action triggering controller 418.

As is shown, and as is alluded to above, the data interpretation controller 414 may comprise a product suggestion controller 308 configured for intelligently suggesting various consumer products. Such consumer products may be suggested in accordance with consumer specific parameters (including demographic, previous purchase behaviour) and also other consumer specific parameters such as consumer behaviour habits of other consumers.

The data interpretation controller 414 may further comprise a data verification controller 313 configured for identifying opportunities for enhancing the integrity of the consumer product metadata 301, List Metadata, Store Metadata and the like.

For example, if a price for a particular consumer product is "soft" (i.e., identified as potentially being unreliable) the data verification controller 313 is able to identify such so as to generate an associated data verification action from the data verification action controller 420 which may be conveyed to the relevant electronic devices of the network 213 verification by the consumer such as, for example, by the consumer verifying the price, adding the barcode, verifying the aisle, verifying how busy a store is, verifying the product quality and the like.

The data interpretation controller 414 may further comprise an informational controller 317 configured for generating various informational notification actions from the informational notification actions controller 421 to which may be conveyed to the relevant electronic devices of the network 213 generally by way of push notification, other GUI alerts (for example newsfeed items, promoted items on a comparison screen), email and the like.

As is also shown in the data flow 400, such crowd-sourced aggregated event metadata 402 may be fed into a machine learning algorithm 322.

In embodiments, the machine learning algorithm 322 may comprise an optimiser configured to optimise each of the modules of the data interpretation controller 414. Specifically, as is shown, the machine learning algorithm 322 may comprise a product suggestion model optimiser 410 for generating trained data 422 for optimising the product suggestion controller 308. Similarly, the machine learning algorithm 322 may comprise a data verification model optimiser 411 and an informational notification model optimiser 412 for optimising the respective data verification controller 313 and informational controller 317.

The product suggestion model optimiser 410 may be configured for optimising the purchase of a suggested product. The data verification model optimiser 411 may be configured for optimising the likelihood or probability of accuracy of network wide metadata and of receipt of consumer feedback or alternatively the integrity of received feedback.

Figure 6:
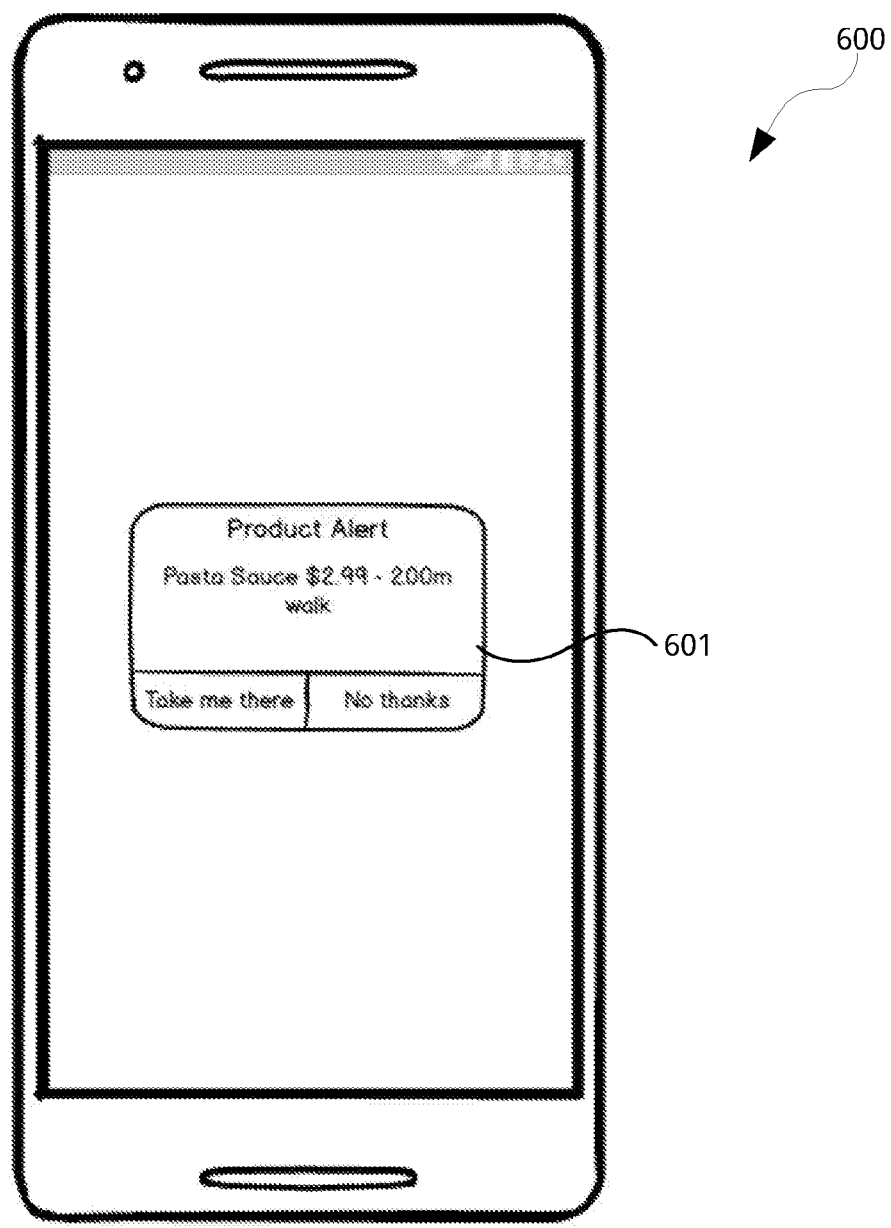
FIG. 6 shows an exemplary informational notification prompt displayed by the electronic device of the system of FIG. 2 in accordance with an embodiment.

The informational notification model optimiser 412 may be configured for optimising notifications in accordance with the acceptance of such notifications, such as the acceptance of the notification 601 as a substantially shown in FIG. 6.

By way of an example, the machine learning algorithm 322, may use a Recurrent Neural Network (RNN) model, trained on the aggregated event metadata 402 and may identify that a particular product suggestion is purchased more frequently by consumers as opposed to another product suggestion (as is ascertained from the shopping list graphical user interface 304) and therefore may bias the product suggestion accordingly.

It should be noted that the machine learning algorithm 322 may further be configured for optimising the action triggering controller 418 so as to optimise the triggering of associated actions.

By way of one example, the machine learning algorithm 322 may identify that a product suggestion has a greater likelihood of being purchased by a consumer if such product suggestion is made prior to the consumer electronic device 213 entering the virtual geo-fence 101 of the applicable store and therefore may optimise the action triggering controller 418 accordingly.

By way of a further example, the machine learning algorithm 322 may identify that females are more likely to purchase a product if suggested prior to inward breaching of the virtual geo-fence 101 whereas males are more likely to purchase a product only when suggested in-store (i.e. once the consumer electronic device 213 has already breached the virtual geo-fence 101 of the applicable store) and may therefore optimise the action triggering controller 418 accordingly.

In embodiments, the trained artificial intelligence analytics engine 413 may take the form of an artificial neural network and therefore the trained data 422 may represent the optimised weightings for each node of the neural network.

Turning now to FIG. 5, there is shown an exemplary graphical user interface 500 displayed by the consumer electronic device 213.

As is shown, the shopping list comprises a plurality of quick products, being milk, spaghetti and bread and furthermore a specific product, being Colgate Sensitive Toothpaste.

The user may have configured such a list by inputting such items. In one embodiment, as the user types, the interface 500 utilises text prediction to suggest products from the product tree 301. In further embodiment, the list may be populated with consumer products previously bought, frequently bought or predicted to be required by the consumer using AI insights (as suggestion actions from previous events, either by that user or even other users in the network). In further embodiment, the text of webpage data (whole webpage or text selected by the user and the like) may be parsed against a product reference listing or alternatively intelligently analysed so as to overlay control/s on the interface 500 (including for product suggestions 501 (product add, product comparison, product search, and new product for example), and also data verification prompts 503 (submit product review (including on the network sending to friends on the social network)).

Now, as is shown, the interface 500 comprises product suggestions 501 generated by the product suggestion controller 308 and product suggestion action controller 419 and also data verification prompts 503 generated by the data verification controller 313 and data verification action controller 420.

Specifically, for the milk quick product, the shopping list interface 501 generates product suggestions wherein, for example, specific and intelligently suggested products within this quick product category are suggested such as Dairy Farmers milk and Paul's milk.

Additional artificial intelligence insights may be associated therewith, including locational and pricing insights wherein, for example, as can be seen, for the suggested Dairy Farmers milk, the specific location in-store is shown (being aisle three and the second shelf from the top) and, for Paul's milk, the fact that Paul's milk is currently the cheapest in-store.

However, as is also shown, a product suggestion may suggest a product in another location on account of lower pricing. As is shown, the product suggestion 501 further comprises suggestion for Coles milk which is only $1 but requires a 250 m walk to another location.

For the spaghetti quick product, as shown, the product suggestion 501 may further intelligently recommend a specific type of spaghetti. As alluded to above, the type of spaghetti suggested may be generated by the trained artificial intelligence analytics engine 413 in an intelligent manner so as to be optimised for purchasing thereof by the consumer. For example, the particular type of consumer product may be derived from consumer specific metadata such as wherein, gluten-free spaghetti is suggested for the specific consumer.

Alternatively, the particular type of spaghetti suggested may be suggested in accordance with an analysis of event metadata 402 received from other consumers, including similar consumers and other parameters.

As is shown, the product suggestion 501 may also intelligently suggest associated items such as pasta sauce wherein the machine learning algorithm 322 has taken into account that consumers frequently purchase these types of products together whilst they may fall into different product categories.

The utilisation of a trained artificial intelligence analytics engine 413 may further generate unintuitive artificial intelligence insights wherein, for example, for the bread quick product, the interface 500 may suggest shoe polish. Whereas such may seem unintuitive, shoe polish may be in fact quite relevant to the user.

As is also shown, the interface 500 displays a data verification prompt 503 wherein, as alluded to above, the data verification controller 313 is identified an opportunity to enhance the integrity of the product data 307.

As is shown, for the Colgate sensitive toothpaste, the data verification prompt 503 asks the user whether the price is in fact $2.99 and furthermore, is it in fact in aisle 3. As is shown, the user may check the check box if so or alternatively input the correct amount.

In further embodiment, the system 200 may be configured for performing OCR analysis on consumer purchase receipts so as to be able to gather appropriate product data 307 accordingly, including price data.

As is shown, the interface 500 comprises an OCR receipt button 504 which the user may utilise when capturing an image of the purchase receipt utilising the image sensor 217 of the consumer electronic device 213.

For each of the consumer products on the shopping list interface 500, the user is able to utilise the associated purchase confirmation input (checkbox or the like) to indicate whether or not the product has been purchased or not.

As such, by utilising such purchase behaviour feedback derived from the purchase confirmation inputs, the machine learning algorithm 322 is further able to train the artificial intelligence analytics engine 413 accordingly.

The utilisation of a trained artificial intelligence analytics engine 413 may further generate anti-fraud artificial intelligence insights wherein, for example, a user may maliciously submit incorrect price updates or fraudulent photographic proof of their purchase to claim a reward from a brand perhaps.

The trained artificial intelligence analytics engine 413 may be configured to identify anomalies such as by using a one-class Support Vector Machine (SVM) or a one-class neural network model. The data may not only be associated to the purchase behaviour but also the pre-purchase behaviour, such as when and where the items were added to the list and also the past history of the user for such updates and claims, the data verification controller 313 can identify anomalies and irregular behaviour. This would generate an associated data verification action from the data verification action controller 420 which may be conveyed to the user's electronic device to ask the user to further prove purchase of the item (e.g. scan the barcode at home).

For another example, a brand may wish to know the current in-store condition of their products on a shelf, in an aisle, in a particular local supermarket to ensure that their product is positioned correctly or that the shelf is adequately and correctly stocked. When a user is shopping in this local supermarket, the data verification controller 313 may be able to predict from a user's purchase confirmation input for other items in a store (such as by checkbox user interface input or the like) and other current app behaviour (such as inward breaching of a geo-fence perimeter for example), that the user may be in the same aisle as the product for which the brand requires the current in-store condition information. As such, the action triggering controller 418 may generate an associated data verification action using the data verification action controller 420 which may be conveyed to the user's electronic device to prompt the user to take a photo of the shelf for the brand, for a reward perhaps.

For another example, a user may submit a new product description. The trained artificial intelligence analytics engine 413 may be configured to generate intelligent artificial intelligence categories for "quick products" such as by using a multiclass decision forest or multiclass neural network model. This would generate associated data verification actions from the data verification action controller 420 which may then be conveyed to relevant electronic devices of the network 213 so that those users can verify and validate the suggested categorisations Turning now to FIG. 6, there is shown an informational notification 601 having been generated by the informational controller 317.

As can be seen, the notification 601, having ascertain the location of the consumer electronic device 213, alerts the user as to the proximity of an intelligent product suggestion, and furthermore displays information as to the ascertain price of such a suggested product.

Utilising the button inputs, the user is able to initiate a navigational interface to navigate to the product or alternatively dismiss the alert.

Various exemplary embodiments will now be provided to further illustrate the functionality of the system 200. It should be noted that these embodiments are exemplary only and that no technical limitation should necessarily be imputed to all embodiments accordingly.

The first example, the user selects a quick product utilising the shopping list GUI 500.

In response, the product suggestion controller 308 intelligently suggests specific products related to the quick product. Furthermore, should any product metadata associated with the quick product be identified by the data verification controller 313 as being unreliable ("soft"), the data verification controller 313 may trigger a data verification action from the data verification action controller 420 to seek to gather further product meta data accordingly.

Furthermore, the informational controller 317 may identify relevant information in relation to the quick product and a notification action accordingly.

As alluded to above, the machine learning algorithm 322 may have trained the data interpretation controller 414 and/or action triggering controller 418 so as to optimise the likelihood of the consumer accepting, or otherwise interacting with the suggested product, data verification request and/or informational notification.

In a further example, the system, 200 by ascertaining the location of the consumer electronic device 213, ascertains that the consumer electronic device 213 has inwardly breached the perimeter of the virtual geo-fence 101 surrounding a store. As such, the system 200 is able to infer that the user is likely going shopping.

Having identified such a possible event, the data interpretation controller 414 may implement any potential matching actions from the action triggering controller 418.

Additionally, various relevant data may be updated in response to such an event such as wherein, for example, the system 200 is able to retrieve product data, product specials and the like from the appropriate store. Furthermore, the system 200 may analyse recent or substantial real-time event meta data 402 associated with other consumers within the same area. As such, the data interpretation controller 414 may operate utilising such updated information.

In a further embodiment, the user confirms the purchase or selection (such as by lifting a product from the shop and placing it in a trolley or basket) of a product utilising the purchase confirmation input such as the checkbox input as is substantially shown in FIG. 5.

As such, from the specific product indicated, the system 200 is able to infer other information, such as the in-store location of the consumer such as now to aisle resolution. As such, the product suggestion controller 308 is then able to suggest other products within the same in-store location such as other products within the same or adjacent aisles.

Also, having received confirmation of the pickup of such a product, the product suggestion controller 308 may therefore not recommend the same or similar products.

Furthermore, shopping list interface 500 may suggest the next product to pick up in accordance with proximity.

Other information may be gathered from the interaction of the consumer with a shopping list GUI 500, such as the time taken to complete the shop, such as between the timestamps between the first and last item text from the shopping list interface 500.

Furthermore, the frequency or amount of interactions of consumers utilising the interface 500 may be utilised to infer the busyness of the particular store so as to allow the trained artificial intelligence analytics engine 413 to perhaps suggest shopping at another time or location. Such information may also be gathered from the user by way of an informational notification prompt wherein the prompt queries the user as to the current state of busyness of the store or other in-store information.

In further example, utilising the data verification prompt 503, the user submits a price for a consumer product within a shop.

As such, the data verification controller 313 may ascertain that the consumer is willing to provide such feedback and may therefore increase the frequency of subsequent requests.

Furthermore, in this case, for a particular product, the data verification controller 313 may request information relating to related consumer products, such as other consumer products within the same aisle.

In a further example, the system 200 detects the outer breaching of the virtual geo-fence 101 by the consumer electronic device 213 indicative of the consumer having left the store location. As such, the system 200 is able to infer that the user has completed shopping.

As such, in embodiments, the product suggestion controller 308 may suggest consumer product probably required by the consumer at other locations near the store location, such as, for example, recommending a newspaper from an adjacent news agency.

Furthermore, the event metadata 402 may be analysed to identify correlations between consumers and store locations, such as by estimating the ease of parking by analysing the volume of consumers within the parameter and also the time taken to complete a shopping trip.

In a further example, the system 200 may detect the inward breach of a home virtual geo-fence 101 indicative of the user having returned home. As such, the system 200 is able to infer that the user is probably going to unpack of the consumer products purchased.

As such, during the unpacking process, the data verification controller 313 may prompt the user with a data verification action from the data verification action controller 420 to provide meta data relating to the various products purchased.

Furthermore, the data verification controller 313 may receive OCR data on a shopping receipt so as to be able to ascertain product meta data therefrom, such as by keyword matching line items and identifying the associated pricing information (price, unit price, special price, discount rate, product, proof of purchase), list information (including products purchased, store metadata, total purchase price, purchase method, register number, register attendant details, store manager details, volume purchased, quantity purchased, product receipt alias name, taxation status and the like)

Furthermore, the data verification controller 313 may receive OCR data on shopping related documents (including product package labels, aisle labels, shelf tags/tickets and the like) so as to be able to ascertain shopping meta data (including product, aisle, shelf and the like) therefrom, such as by keyword matching characters and identifying the associated shopping information (including nutritional information, rating, product location, aisle grouping of product categories within an aisle, in-store retailer specific product code/barcode, product name, shelf price, price special status, product range groupings and the like).

Furthermore, for any consumer products having an associated store special requiring the purchase of such a product, the informational controller 317 may prompt the user with an informational notification action from the informational notification actions controller 421 of such wherein, for example, the prompt may inform the user that, should the user to capture an image of a particular product, the user is eligible to claim a credit reward against a future shopping trip.

Figure 7:
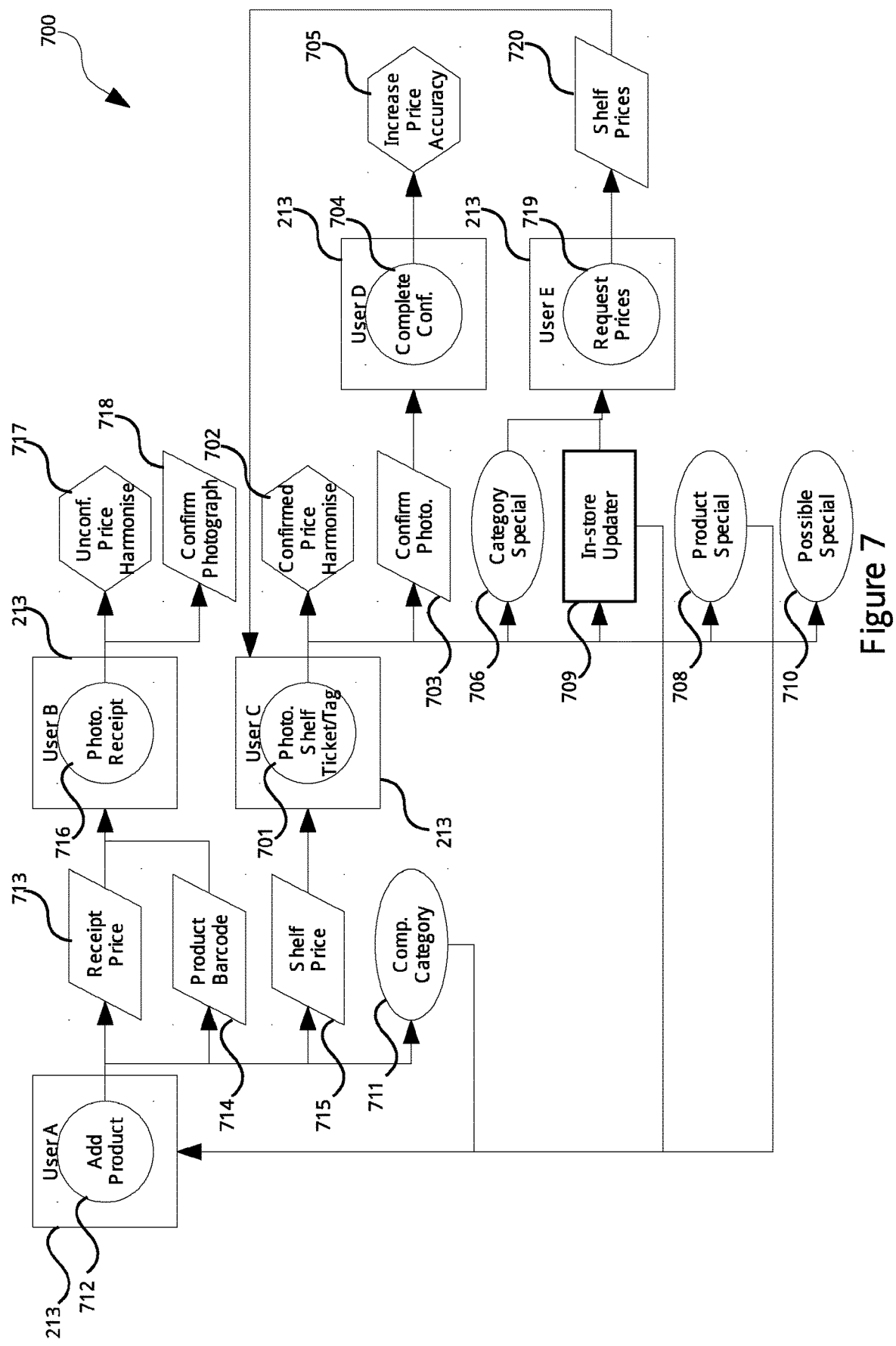
FIG. 7 shows an exemplary personal behavioural interaction with the system.

Turning now to FIG. 7, there is shown an exemplary user case scenario 700 illustrating the features and functionality of the system 200. It should be noted that the scenario 700 is exemplary only and that no technical limitations should necessarily be imputed to all embodiments of the system 200 accordingly. Furthermore, in the exemplary scenario 700, In-store consumer behaviour event metadata 425 are shown as circles, the data verification actions from the data verification action controller 420 are shown as parallelograms, the informational notification actions from the informational notification actions controller 421 are shown as rectangles, product suggestion actions from the product suggestion actions controller 419 are represented as ellipses and data updates to the data model 201 are shown as hexagons.

Now, the scenario 700 starts at step 712 where User A adds "HP Sauce 120 g" with no price or bar-code to the shopping list for local Store 1 when at home. The event 712 may thereafter cause the system 200 to trigger a series of data verification actions from the data verification controller 313 comprising a first action 713 wherein the system 200 sends data verification requests 713 to other consumer electronic devices 213 to request prices from users who recently bought the same product. Alternatively, or additionally, an action 714 may be sent to other consumer electronic devices 213 to request barcodes from other users who have recently bought the same product Upon receipt of the data verification actions 713, 714, the electronic device of User B may generate an event 716 wherein the User B updates the price for the item using a photograph of the price entry on their shopping receipt when at home. As such, the event 716 may further cause the system 200 to perform a data update 717 to update the price of the item with the provided pricing information but to set a flag representing that the price is "unconfirmed". Furthermore, the system 200 may then initiate a data verification action 718 to generate a data verification action to request pricing confirmations from other electronic devices of other users, for example to confirm that the photograph of the price entry on their shopping receipt matches the product and price from the data verification action 713.

Furthermore, with User A having performed the product add event 712 (by typing search terms matching the product, by capturing an image of the product package, by scanning the barcode or the like), the system 200 may generate an AI generated product suggestion action 711 which, for example, it is recommended to User A the adding of complementary item category "Oven Baked Chips" to the shopping list, from which the system 200 has learnt utilising a machine learning algorithm 322 as commonly being associated with "HP Sauce 120 g".

The event 712 may further cause the system 200 to initiate a price request data verification action 715 for a consumer electronic device 213 of User C, on account of the system 200 having determined that User C is probably going to be within Store 1 or within the same aisle in the near future. Such a prediction may be generated by the machine learning algorithm 322 which is trained on the various event metadata 402, including the consumer behaviour event and location metadata 404.

Upon receipt of the price request data verification action 715, the electronic device of User C may generate an event 701 wherein User C updates a price in Store 1 from, for example, from $1 to $1.30 and captures an image of the shelf price tag or ticket. In response, the system 200 performs a data update 702 to update the price both in the store and, if applicable, updates corresponding pricing of related stores of the same retailer (price harmonisation).

Furthermore, the data verification controller 313 may generate a data verification action from the data verification action controller 420 and send a validation request 703 to a consumer electronic device 213 of another User D to confirm the price. Upon User D confirming that the shelf price matches the photograph taken, the system 200 performs a price confirmation update 705.

Additionally, in response to events 701, the system 200 may initiate a product suggestion 706 to notify all other users of the system having "Brown Sauce" (i.e. item category) on their associated shopping lists that, for example, 120 g of HP Sauces is on special at $1.30. In this regard, an informational notification action 707 may be sent to other electronic devices.

The system 200 may further generate a further product suggestion 708 to notify all other users having "HP Sauce 120 g" on their shopping lists that the item is on special at $1.30 at Store 1. It should be noted that by User C updating the price at event 701, the system 200 may, by inspecting the relevant metadata, notify the original user of the new price of the item that was initially added by the original user even though the original user did not specifically asked for a price update.

The price update event 701 may further comprise the sending of an informational notification action 709 which notifies users that may shop at Store 1 that there is currently at least one active other user within the store (which may be of interest to the other users for things such as price check requests, availability requests and the like). Upon User E receiving informational notification action 709, the electronic device 230 may generate an event 719 wherein User E wishes to know the price for Huggies Nappies in Store 1 and offers to trade User C 50 points to find out. In response, the system 200 may generate a data verification action 720 to send a notification to the consumer electronic device 213 of User C.

The event 701 may further trigger a further product suggestion 710 which notifies users having "HP Sauce 120 g" on their shopping lists at Store 2 that the item is probably also on special also at $1.30, given that Store 2 is operated by the same retailer.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computerized system for in-store consumer behaviour event metadata aggregation, data verification and the artificial intelligence analysis thereof for data interpretation and associated action triggering, the system comprising:
   a data model having:
      consumer product metadata comprising at least:
         consumer product ID metadata; and
         consumer product location metadata;
   the system comprising a processor and a memory configured to provide computer program instructions to the processor, the processor programmed for:
   receiving in-store consumer behaviour event metadata from a plurality of consumer electronic devices, the in-store consumer behaviour event metadata at least partially derived from a shopping list GUI displayed by a display device of each of the consumer electronic devices, the shopping list GUI comprising a listing of consumer-specific consumer products and associated purchase confirmation inputs indicative of the purchase of said consumer-specific consumer products,
   inputting the in-store consumer behaviour event metadata into a trained artificial intelligence analytics engine, the artificial intelligence analytics engine having been trained using a machine learning algorithm having as input in-store consumer behaviour event metadata training data and wherein the machine learning algorithm is at least trained in accordance with purchase confirmation data derived from the purchase confirmation inputs, the analytics engine comprising:
   a data interpretation controller comprising:
      a data verification data interpretation controller, and
   an action triggering controller comprising:
      a data verification action controller;
   wherein, the data verification data interpretation controller is configured for identifying a data verification opportunity match in accordance with the in-store consumer behaviour event metadata; and
   generating a data verification action using the data verification action controller, the data verification action configured according to the in-store consumer behaviour event metadata;
   sending a data verification action electronic communication to at least one of the plurality of consumer electronic devices;
   receiving product data metadata response data responsive to the data verification action electronic communication from the at least one consumer electronic device; and
   updating the consumer product data using the product data metadata response data.

2. The computerized system as claimed in claim 1, wherein the data interpretation controller further comprises:
a product suggestion data interpretation controller
and wherein the action triggering controller further comprises:
a product suggestion action controller
and wherein, in use:
the product suggestion data interpretation controller is configured for identifying a product suggestion opportunity match in accordance with the in-store consumer behaviour event metadata; and
the product suggestion action controller is configured for generating and sending a product suggestion action for display by the shopping list GUI.

3. The computerized system as claimed in claim 2, wherein the product suggestion action comprises in-store location data of the product suggestion.

4. The computerized system as claimed in claim 1, wherein the in-store location data is indicative of at least one of an aisle number and shelf.

5. The computerized system as claimed in claim 3, wherein one or more of the consumer electronic devices further comprises a sensor for sensing in-store location data and wherein the in-store consumer behaviour event metadata further comprises the in-store location data.

6. The computerized system as claimed in claim 5, wherein the sensor comprises at least one of a near field communication sensor and Bluetooth beacon (BLE) sensor.

7. The computerized system as claimed in claim 1, wherein the consumer electronic device further comprises an image sensor for capturing an image of a product and wherein product data is derived from the image.

8. The computerized system as claimed in claim 7, wherein the product data comprises at least one of product ID and product pricing data.

9. The computerized system as claimed in claim 1, wherein the data interpretation controller further comprises:
an informational notification data interpretation controller;
and wherein the action triggering controller further comprises:
an informational notification action controller
and wherein, in use:
the informational notification data interpretation controller is configured for identifying and informational notification opportunity match in accordance with the in-store consumer behaviour event metadata, and
the informational notification action controller is configured for sending a notification to the at least one electronic device.

10. The computerized system as claimed in claim 1, wherein the data interpretation controller is optimised using the machine learning algorithm.

11. The computerized system as claimed in claim 1, wherein the action triggering controller is optimised using the machine learning algorithm.

12. The computerized system as claimed in claim 1, wherein the machine learning algorithm is configured for optimising the product suggestion controller according to purchase confirmation input data derived from the shopping list GUI.

13. The computerized system as claimed in claim 1, wherein the machine learning algorithm is configured for optimising the data verification data interpretation controller according to the probability of receipt of the product data metadata response data.

14. The computerized system as claimed in claim 1, wherein the machine learning algorithm is configured for optimising the data verification data interpretation controller according data integrity of the product data metadata response data.

15. The computerized system as claimed in claim 1, wherein the machine learning algorithm is configured for optimising the informational controller according to consumer interactions with informational notification prompts.

16. The computerized system as claimed in claim 1, wherein the consumer product metadata comprises at least one product category.

17. The computerized system as claimed in claim 16, wherein the product data metadata response data comprises product price metadata.

18. The computerized system as claimed in claim 2, wherein the electronic device further comprises an image sensor for capturing an image of a product and wherein product data is derived from the image, wherein the in-store consumer behaviour event metadata comprises image data and wherein the machine learning algorithm is configured for optimising the product suggestion action controller using object recognition of the image data.

* * * * *